United States Patent
Lee et al.

(10) Patent No.: US 10,338,221 B2
(45) Date of Patent: Jul. 2, 2019

(54) DEVICE FOR EXTRACTING DEPTH INFORMATION AND METHOD THEREOF

(71) Applicant: LG INNOTEK CO., LTD., Seoul (KR)

(72) Inventors: Myung Wook Lee, Seoul (KR); Sung Ki Jung, Seoul (KR); Gi Seok Lee, Seoul (KR); Kyung Ha Han, Seoul (KR); Eun Sung Seo, Seoul (KR); Se Kyu Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 297 days.

(21) Appl. No.: 15/115,159

(22) PCT Filed: Jan. 28, 2015

(86) PCT No.: PCT/KR2015/000911
§ 371 (c)(1),
(2) Date: Jul. 28, 2016

(87) PCT Pub. No.: WO2015/115797
PCT Pub. Date: Aug. 6, 2015

(65) Prior Publication Data
US 2016/0349369 A1    Dec. 1, 2016

(30) Foreign Application Priority Data

Jan. 29, 2014  (KR) .................. 10-2014-0011590
Jan. 29, 2014  (KR) .................. 10-2014-0011596

(51) Int. Cl.
*G01C 3/08* (2006.01)
*G01S 17/89* (2006.01)
(Continued)

(52) U.S. Cl.
CPC ............ *G01S 17/89* (2013.01); *G01S 7/4814* (2013.01); *G01S 7/4865* (2013.01); *H04N 13/0271* (2013.01)

(58) Field of Classification Search
CPC ...... G01S 17/89; G01S 7/4865; G01S 7/4814; H04N 13/0271
(Continued)

(56) References Cited

U.S. PATENT DOCUMENTS

2005/0057741 A1    3/2005  Anderson et al.
2010/0290674 A1*  11/2010  Kim .................. G01S 17/89
                                                    382/106
(Continued)

FOREIGN PATENT DOCUMENTS

JP    10-153653 A    6/1998
JP    2006-30147 A   2/2006
(Continued)

*Primary Examiner* — Mark Hellner
(74) *Attorney, Agent, or Firm* — Birch, Stewart, Kolasch & Birch, LLP

(57) ABSTRACT

A device for extracting depth information according to one embodiment of the present invention comprises: a light outputting unit for outputting IR (InfraRed) light; a light inputting unit for inputting light reflected from an object after outputting from the light outputting unit; a light adjusting unit for adjusting the angle of the light so as to radiate the light into a first area including the object, and then for adjusting the angle of the light so as to radiate the light into a second area; and a controlling unit for estimating the motion of the object by using at least one of the lights between the light inputted to the first area and the light inputted to the second area.

12 Claims, 12 Drawing Sheets

(51) Int. Cl.
   *G01S 7/486*    (2006.01)
   *G01S 7/481*    (2006.01)
   *H04N 13/02*    (2006.01)

(58) Field of Classification Search
   USPC ...................................................... 356/5.01
   See application file for complete search history.

(56) References Cited

U.S. PATENT DOCUMENTS

2013/0101176 A1    4/2013  Park et al.
   2013/0222543 A1    8/2013  Bae et al.
   2016/0268732 A1*   9/2016  Arichika ............ H01R 13/6271
   2017/0372486 A1*  12/2017  Jin .......................... G06T 7/254

FOREIGN PATENT DOCUMENTS

JP        2010-256291 A    11/2010
   JP        2011-243862 A    12/2011
   JP         2013-15338 A     1/2013
   JP        2013-156139 A     8/2013
   KR     10-2010-0081197 A     7/2010
   KR     10-2010-0122988 A    11/2010
   KR     10-2011-0021500 A     3/2011
   KR     10-2013-0045018 A     5/2013
   KR     10-2013-0098042 A     9/2013
   WO      WO 2013/121267 A1    8/2013
   WO      WO 2014/014838 A2    1/2014

* cited by examiner (a)

(b)

(a) ODD-NUMBERED FRAME (b) EVEN-NUMBERED FRAME (c) DEPTH IMAGE

DEVICE FOR EXTRACTING DEPTH INFORMATION AND METHOD THEREOF

CROSS REFERENCE TO RELATED APPLICATIONS

This application is the National Phase of PCT International Application No. PCT/KR2015/000911, filed on Jan. 28, 2015, which claims priority under 35 U.S.C. 119(a) to Patent Application Nos. 10-2014-0011590, filed in the Republic of Korea on Jan. 29, 2014 and 10-2014-0011596, filed in the Republic of Korea on Jan. 29, 2014, all of which are hereby expressly incorporated by reference into the present application.

TECHNICAL FIELD

The present disclosure relates to extracting depth information, and more particularly, to a device for extracting depth information using a time-of-flight (TOF) method, and a method thereof.

BACKGROUND ART

A technology of acquiring a three-dimensional image using a capturing device is developing. Depth information (depth map) is required for acquiring a three-dimensional image. Depth information is information that indicates a spatial distance and shows perspective information of a point with respect to another point in a two-dimensional image.

A method in which infrared (IR) structured light is projected to an object and light reflected from the object is interpreted to extract depth information is one of the methods of acquiring depth information. According to the method using the IR structured light, there is a problem in that it is difficult to obtain a desired level of depth resolution for a moving object.

A time-of-flight (TOF) method is gaining attention as a technology for substituting the method using IR structured light. According to the TOF method, a distance from an object is calculated by measuring time of flight, i.e., the time taken for emitted light to be reflected.

Generally, a camera according to the TOF method adjusts the angle of light to scan a front surface of an object. The TOF camera has problems of having low optical efficiency and a large number of operations.

DISCLOSURE

Technical Problem

The present disclosure is directed to providing a device and method for extracting depth information, in which a TOF method is used to extract depth information.

Technical Solution

According to an embodiment of the present disclosure, a device for extracting depth information includes a light outputting unit that outputs infrared (IR) light, a light inputting unit that is input with light output from the light outputting unit and then reflected from an object, a light adjusting unit that adjusts an angle of the light such that a first region including an object is irradiated with the light and then adjusts the angle of the light such that a second region, which is a portion of the first region, is irradiated with the light, and a controlling unit that estimates motion in the second region using beams of light sequentially input into the second region over time.

The first region may be an entire region including the object, and the second region may be extracted from the first region and may be a partial region including a predetermined region of the object.

The controlling unit may calculate a time of flight taken for light output from the light outputting unit to be input into the light inputting unit after being reflected from the second region that is irradiated with the light.

The controlling unit may estimate a motion in the second region using a first time of flight calculated using light input at a first time point, a second time of flight calculated using light input before the first time point, and a third time of flight calculated using light input after a second time point.

The controlling unit may estimate a motion in the second region using relative differences between the first time of flight, the second time of flight, and the third time of flight and then compensate for the estimated motion using an interpolation technique.

The light inputting unit may include a plurality of pixels each including a first reception unit and a second reception unit, and the controlling unit may calculate the time of flight using a difference in amounts of light input into the first reception unit and the second reception unit.

The light adjusting unit may include a microelectromechanical system (MEMS) and a MEMS controlling unit.

The controlling unit may include a timing controlling unit that controls time points of the light outputting unit, the light adjusting unit, and the light inputting unit, a conversion unit that converts an electrical signal input through the light inputting unit into a digital signal, and a signal processing unit that calculates times of flight of beams of light sequentially input into the second region over time, estimates a motion in the second region, and extracts depth information of the second region.

According to an embodiment of the present disclosure, a method for extracting depth information includes irradiating a first region including an object with infrared (IR) light, irradiating a second region which is a portion of the first region with IR light, and estimating motion in the second region using beams of light sequentially input into the second region over time.

The estimating may include calculating a first time of flight with respect to light input at a first time point, a second time of flight with respect to light input before the first time point, and a third time of flight with respect to light input after a second time point and estimating motion in the second region using relative differences between the first time of flight, the second time of flight, and the third time of flight.

According to another embodiment of the present disclosure, a device for extracting depth information includes a light source that irradiates an object with light, a holographic element arranged between the light source and the object to adjust an irradiation region of the light source, an actuator that drives the holographic element so that the radiation region is different in first and second frame periods, a light-receiving lens that receives reflected light reflected by the object, a sensor unit that receives the reflected light through the light-receiving lens and synchronizes with each of the first and second frame periods to output first and second image signals, a signal processing unit that processes the first and second image signals to generate first and second frames, and a deinterlacer that merges the first and second frames to each other to generate a depth image.

According to yet another embodiment of the present disclosure, a device for extracting depth information includes first and second light sources that are arranged to be spaced apart from each other and irradiate an object with light, first and second holographic elements arranged between the first and second light sources and the object to adjust irradiation regions of the first and second light sources so that the irradiation regions of the first and second light sources are different from each other, a controlling unit that controls lighting of the first and second light sources so that the first light source emits light in the first frame period and the second light source emits light in the second frame period, a light-receiving lens that receives reflected light reflected by the object, a sensor unit that receives the reflected light through the light-receiving lens and synchronizes with each of the first and second frame periods to output first and second image signals, a signal processing unit that processes the first and second image signals to generate first and second frames, and a deinterlacer that merges the first and second frames to each other to generate a depth image.

Advantageous Effects

According to an embodiment of the present disclosure, a device for extracting depth information with a small number of operations and excellent depth resolution can be obtained. Accordingly, electricity consumed by the device for extracting depth information can be reduced, and a distance from an object can be precisely extracted.

MODES OF THE INVENTION

Figure 1:
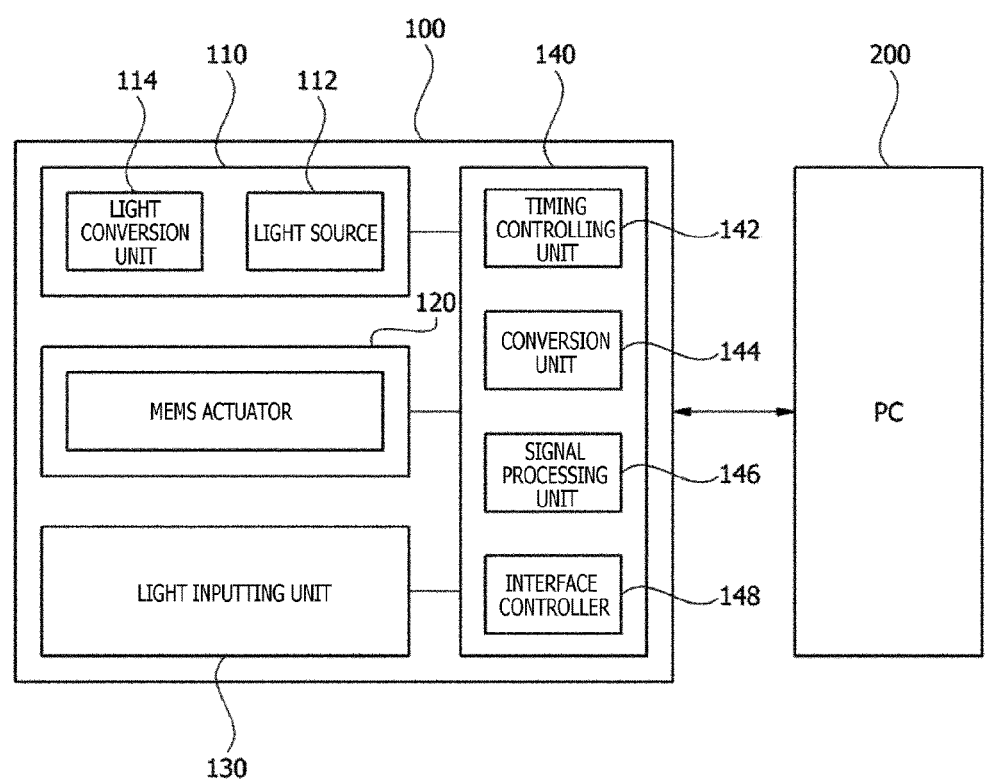
FIG. 1 is a block diagram of a depth information extracting system according to an embodiment of the present disclosure.

Since various modifications may be made to the present disclosure and the present disclosure may have various embodiments, particular embodiments will be illustrated in the drawings and described. However, this does not limit the present disclosure to the particular embodiments, and all modifications, equivalents, and substitutes included within the spirit and scope of the present disclosure should be construed as belonging to the present disclosure.

Terms including ordinals such as first and second may be used to describe various elements, but the elements are not limited by the terms. The terms are only used for the purpose of distinguishing one element from another element. For example, a second element may be referred to as a first element while not departing from the scope of the present disclosure, and likewise, a first element may also be referred to as a second element. The term and/or includes a combination of a plurality of related described items or any one item among the plurality of related described items.

When it is mentioned that a certain element is "connected" or "linked" to another element, although the certain element may be directly connected or linked to the other element, it should be understood that another element may exist therebetween. On the other hand, when it is mentioned that a certain element is "directly connected" or "directly linked" to another element, it should be understood that other elements do not exist therebetween.

Terms used in the application are merely used to describe particular embodiments and are not intended to limit the present disclosure. A singular expression includes a plural expression unless the context clearly indicates otherwise. In the application, terms such as "include" or "have" should be understood as designating that features, number, steps, operations, elements, parts, or combinations thereof exist and not as precluding the existence of or the possibility of adding one or more other features, numbers, steps, operations, elements, parts, or combinations thereof in advance.

Unless otherwise defined, all terms including technical or scientific terms used herein have the same meaning as commonly understood by one of ordinary skill in the art to which the disclosure pertains. Terms, such as those defined in commonly used dictionaries, should be construed as having a meaning that is consistent with their meaning in the context of the relevant art and are not to be construed in an idealized or overly formal sense unless expressly so defined herein.

Hereinafter, an embodiment will be described in detail with reference to the accompanying drawings while like reference numerals will be given to the same or corresponding elements regardless of signs in the drawings and overlapping descriptions thereof will be omitted.

According to an embodiment of the present disclosure, an angle of radiated light is adjusted to improve depth resolution.

According to an embodiment of the present disclosure, depth information of a partial region is extracted by irradiating an entire region including an object with light, extracting a partial region from the entire region, and repeatedly irradiating the extracted partial region with light.

Figure 2:
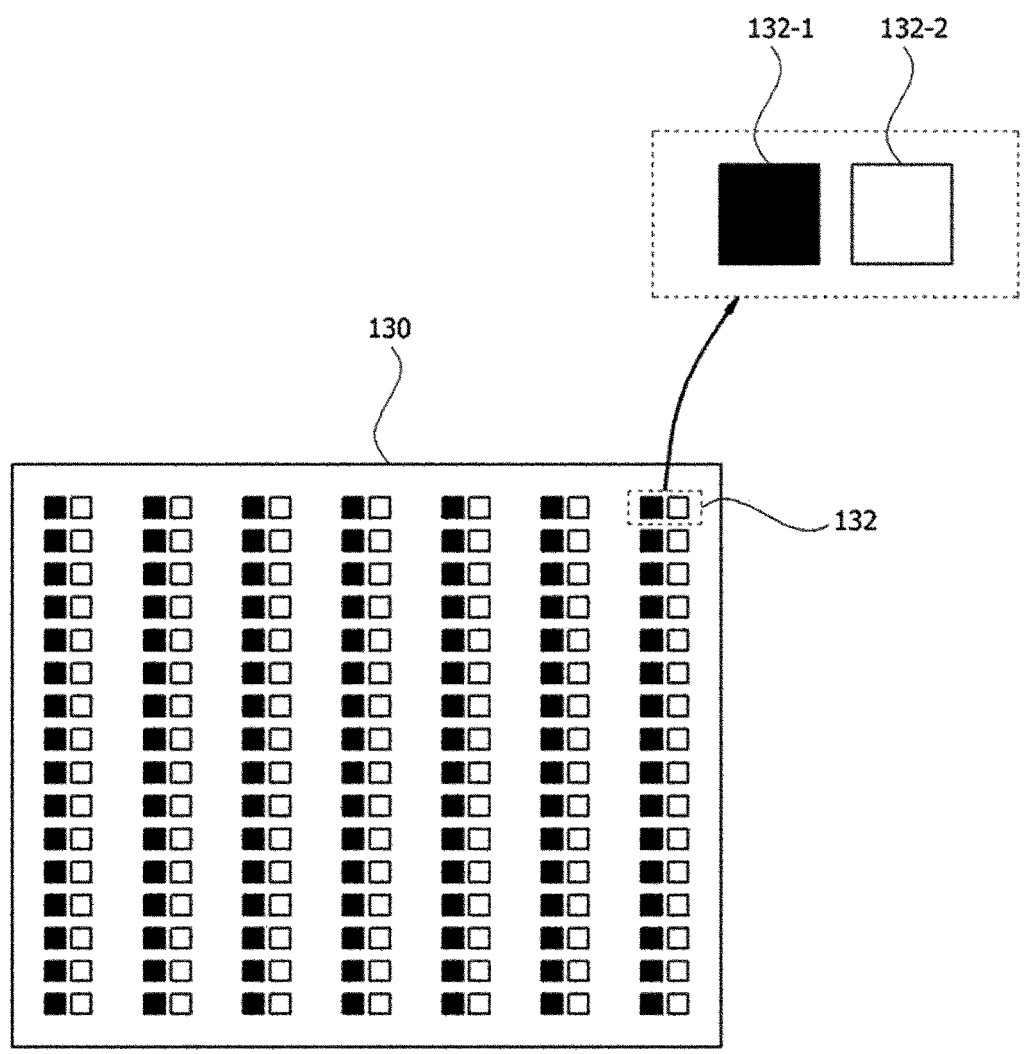
FIG. 2 illustrates a structure of a light inputting unit of a depth information extracting device according to an embodiment of the present disclosure.
Figure 3:
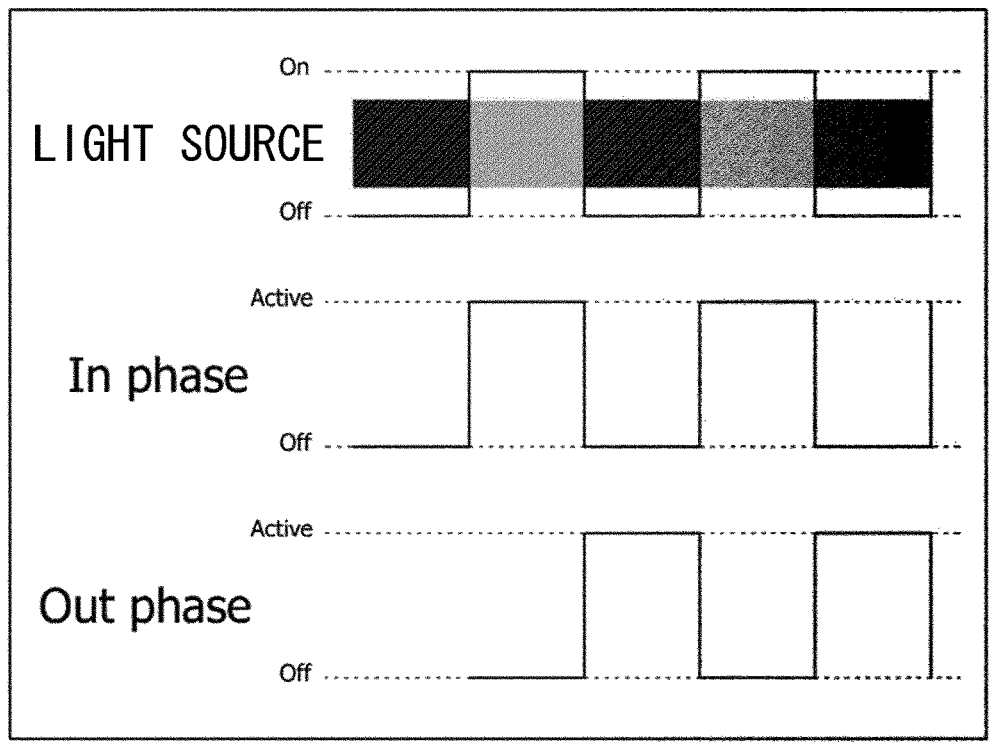
FIG. 3 illustrates the principle of extracting depth information of a depth information extracting device according to an embodiment of the present disclosure.

FIG. 1 is a block diagram of a depth information extracting system according to an embodiment of the present disclosure, FIG. 2 illustrates a structure of a light inputting unit of a depth information extracting device according to an embodiment of the present disclosure, and FIG. 3 illustrates the principle of extracting depth information of a depth information extracting device according to an embodiment of the present disclosure.

Referring to FIG. 1, a depth information extracting system includes a depth information extracting device 100 and a personal computer (PC) 200. The depth information extracting device may be a three-dimensional stereoscopic camera or a portion thereof.

The depth information extracting device 100 includes a light outputting unit 110, a light adjusting unit 120, a light inputting unit 130, and a controlling unit 140.

The light outputting unit 110 outputs infrared (IR) light. The IR light may be, for example, light having a wavelength band that is 800 nm or higher. The light outputting unit 110 includes a light source 112 and a light conversion unit 114. The light source may include at least one laser diode (LD) or light emitting diode (LED) that projects infrared light. Also, the light conversion unit 114 may modulate light output from the light source 112. The light conversion unit 114 may, for example, perform pulse modulation or phase modulation of the light output from the light source 112. Accordingly, the light outputting unit 110 may output light while causing the light source to flicker at every predetermined interval.

The light adjusting unit 120 adjusts an angle of light so that a region including an object is irradiated with light. For this, the light adjusting unit 120 may include a microelectromechanical system (MEMS) actuator 122 and a MEMS controlling unit 124.

Figure 4:
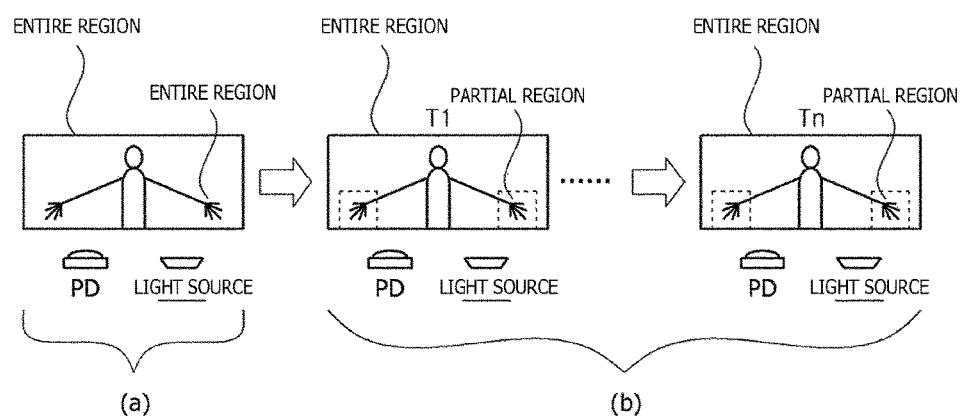
FIG. 4 illustrates an entire region and a partial region sequentially captured over time.

The light adjusting unit 120 may adjust the angle of light so that an entire region including an object is irradiated with light. For example, as in FIG. 4(A), the light adjusting unit 120 may adjust the angle of light so that an entire region including a person is irradiated with the light. Accordingly, light output from the light outputting unit 110 may scan the entire region in units of pixels or lines. Also, the light adjusting unit 120 may also adjust the angle of light so that a partial region, which is a portion of the entire region, is irradiated with the light. For example, as illustrated in FIG. 4(B), the light adjusting unit 120 may adjust the angle of light so that a partial region including hands of the entire region is irradiated with the light. Accordingly, the light output from the light outputting unit 110 may scan only the partial region in units of pixels or lines.

Meanwhile, the light inputting unit 130 is input with light output from the light outputting unit 110 and reflected by an object. The light inputting unit 130 may convert the input light into an electrical signal. The light inputting unit 130 may be an image sensor including a photo diode (PD) or a complementary metal-oxide semiconductor (CMOS). As in FIG. 2, the light inputting unit 130 may include a plurality of pixels 132 arranged. Each pixel may include an in-phase reception unit 132-1 and an out-phase reception unit 132-2.

The controlling unit 140 controls an overall operation of the depth information extracting device 100 and extracts depth information. The controlling unit 140 may be implemented with a controller chip. The controlling unit 140 may include a timing controlling unit 142, a conversion unit 144, a signal processing unit 146, and an interface controller 148. The timing controlling unit 142 controls time points of the light outputting unit 110, the light adjusting unit 120, and the light inputting unit 130. For example, the timing controlling unit 142 may control the flickering cycle of the light outputting unit 110. The conversion unit 144 may convert an electrical signal input through the light inputting unit 130 into a digital signal.

In addition, the signal processing unit 146 calculates times of flight of beams of light sequentially input into the partial region over time, estimates motion in the partial region, and extracts depth information of the partial region. Here, the time of flight of the light may be calculated using a difference between amounts of light input into the in-phase reception unit 132-1 and the out-phase reception unit 132-2. That is, as in FIG. 3, the in-phase reception unit 132-1 may be activated while a light source is turned on, and the out-phase reception unit 132-2 may be activated while the light source is turned off. In this way, when the in-phase reception unit 132-1 and the out-phase reception unit 132-2 are activated with a time difference, a difference occurs in the time of flight of light, i.e., an amount of light received according to a distance from an object. For example, when the object is right in front of the depth information extracting device (i.e., when distance=0), the time taken for light output from the light outputting unit 110 to be reflected is 0 such that a flickering cycle of a light source becomes a light reception cycle without change. Accordingly, only the in-phase reception unit 132-1 receives light, and the out-phase reception unit 132-2 does not receive light. In another example, when the object is spaced a predetermined distance away from the depth information extracting device, a time is taken for light output from the light outputting unit 110 to be reflected such that the flickering cycle of the light source is different from the light reception cycle. Accordingly, a difference occurs between amounts of light received by the in-phase reception unit 132-1 and the out-phase reception unit 132-2.

The interface controller 148 controls an interface with middleware such as the PC 200. For example, the interface controller 148 may transmit information on light input through the light inputting unit 130 after being radiated to an entire region to middleware such as the PC 200. Also, the interface controller 148 may receive information on a partial region extracted by the middleware such as the PC 200 from the middleware such as the PC 200 and then transmit the information to the light adjusting unit 120 and the like.

Figure 5:
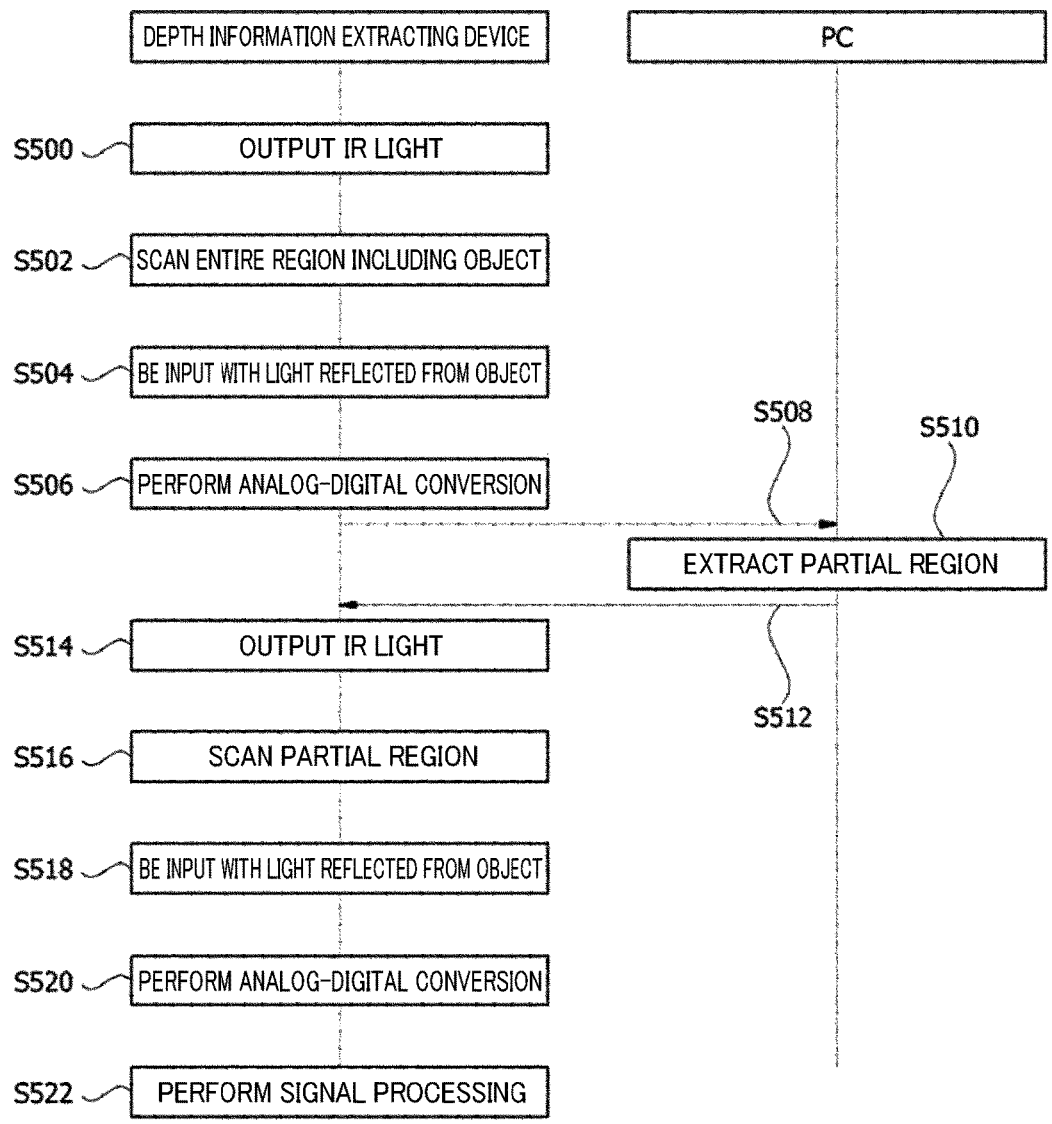
FIGS. 5 and 6 are flowcharts illustrating a depth information extracting method of a depth information extracting device according to an embodiment of the present disclosure.
Figure 6:
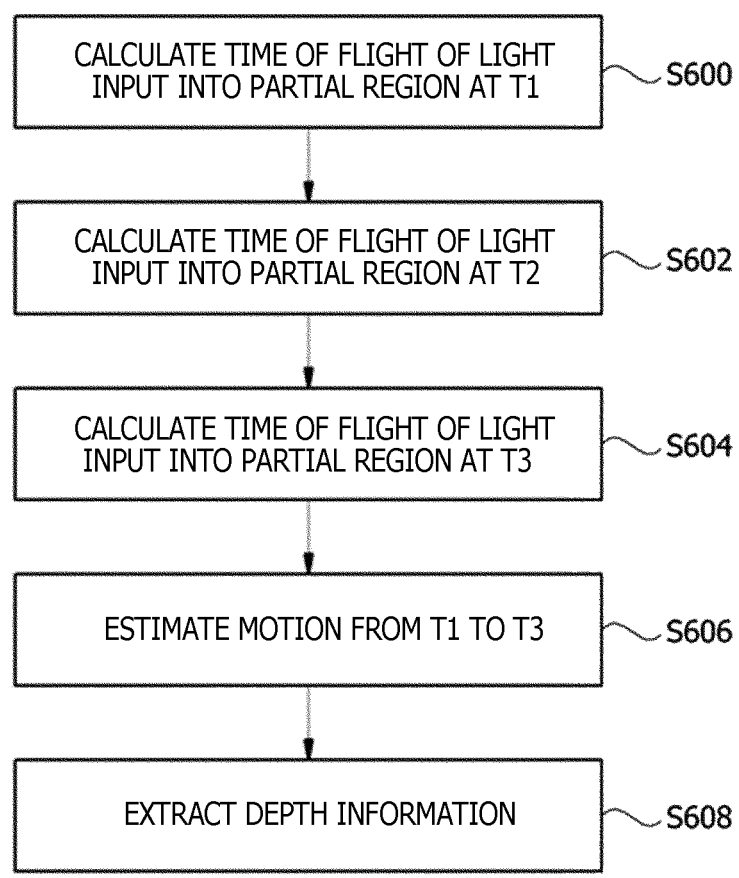

FIGS. 5 and 6 are flowcharts illustrating a depth information extracting method of a depth information extracting device according to an embodiment of the present disclosure. Descriptions of contents overlapping with those of FIGS. 1 to 3 will be omitted.

Referring to FIG. 5, the light outputting unit 110 of the depth information extracting device 100 outputs IR light (S500), and an entire region including an object is irradiated with the output light by adjustment by the light adjusting unit 120 (S502).

In addition, light reflected from the object is input through the light inputting unit 130 (S504), and the controlling unit 140 converts an analog signal received from the light inputting unit 130 into a digital signal (S506) and then transmits the digital signal to the PC 200, for example (S508).

The PC 200 uses the signal received from the depth information extracting device 100 and extracts a partial region of the entire region (S510). The partial region may be a region including an interest target required for implementing an application. For example, when the application is changing a television (TV) channel according to a gesture of a finger, the partial region may include only fingers when the entire region includes the whole body of a person.

The PC 200 transmits information on the extracted partial region to the depth information extracting device 100 (S512).

Meanwhile, the light outputting unit 110 of the depth information extracting device 100 outputs IR light (S514), and the output light is radiated only to the partial region extracted from the entire region by adjustment by the light adjusting unit 120 (S516).

In addition, light reflected from an object unit is input through the light inputting unit 130 (S518), the controlling unit 140 converts the analog signal received from the light inputting unit 130 into a digital signal (S520), and signal processing is performed to extract depth information of the partial region (S522).

According to an embodiment of the present disclosure, the depth information extracting device 100 may scan a partial region several times during the time over which an entire region can be scanned once. Accordingly, Step S514 to Step S520 are repeated several times, and precision of depth information can be improved using the result repeated for multiple times in Step S522. This will be described in detail with reference to FIG. 6.

Referring to FIG. 6, with respect to a partial region, the controlling unit 140 of the depth information extracting device calculates a time of flight of light input through the light inputting unit 130 at a time T1 (S600), calculates a time of flight of light input through the light inputting unit 130 at a time T2 (S602), and calculates a time of flight of light input through the light inputting unit 130 at a time T3 (S604). Here, T1, T2, and T3 may have the same time intervals, and Step S514 to Step S520 in FIG. 5 may be repeated at each of T1, T2, and T3. As described with reference to FIG. 3, the time of flight of light may be calculated using a difference in the amount of light between an in-phase reception unit and an out-phase reception unit.

In addition, the controlling unit 140 estimates a motion in the partial region based on the time of flights at the time T1 to the time T3 (S606) and extracts depth information according to a result of the motion estimation (S608). Here, processes of the motion estimation and the depth information extraction may be performed according to a super resolution (SR) algorithm. That is, as illustrated in FIG. 4(B), after capturing the partial region from T1 to Tn, time of flight at each time may be calculated to estimate relative motion over time. In addition, the estimated motions may be compensated using the interpolation technique and restored, and noise may be reduced therefrom.

In this way, when the partial region is detected from the entire region and depth information on the partial region is extracted, complexity of calculation may be decreased. In addition, because motion information is estimated with respect to the partial region using relative differences in information sequentially input over time, high depth resolution can be obtained. Also, because the partial region may be scanned several times during the time over which the entire region is scanned once, an amount of time for and complexity of calculation of depth information extraction can be decreased.

According to another embodiment of the present disclosure, depth information is extracted by repeating a process of irradiating a partial region including an object with light and adjusting the angle of the light so that the regions are irradiated with light.

Figure 7:
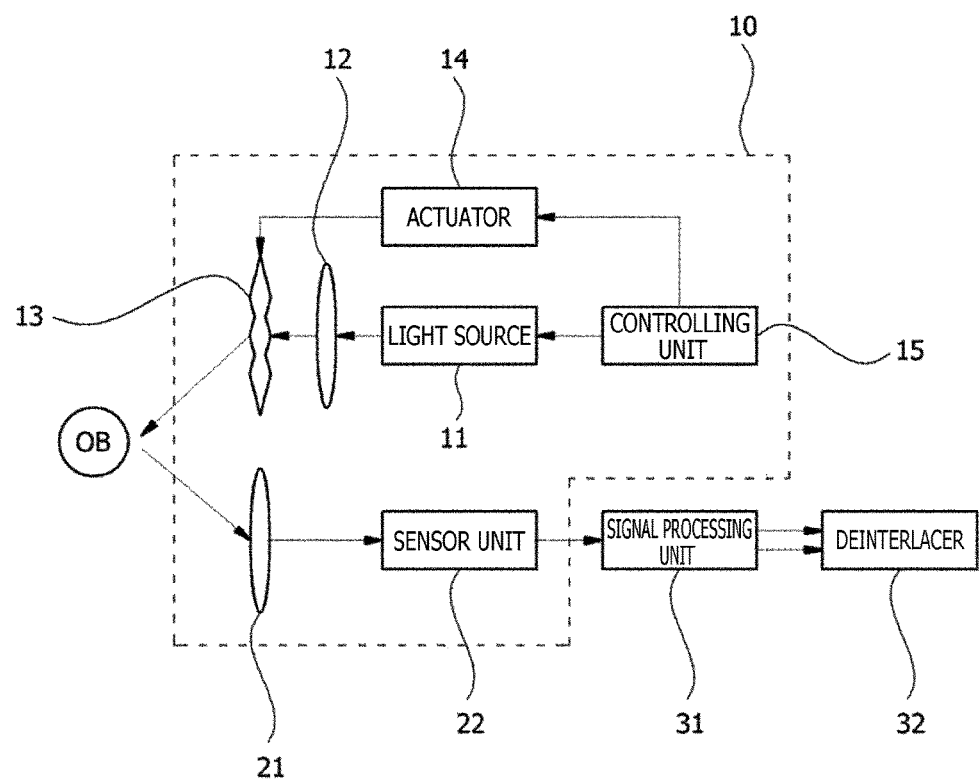
FIG. 7 is a block diagram schematically illustrating a depth information extracting device according to another embodiment of the present disclosure.
Figure 8:
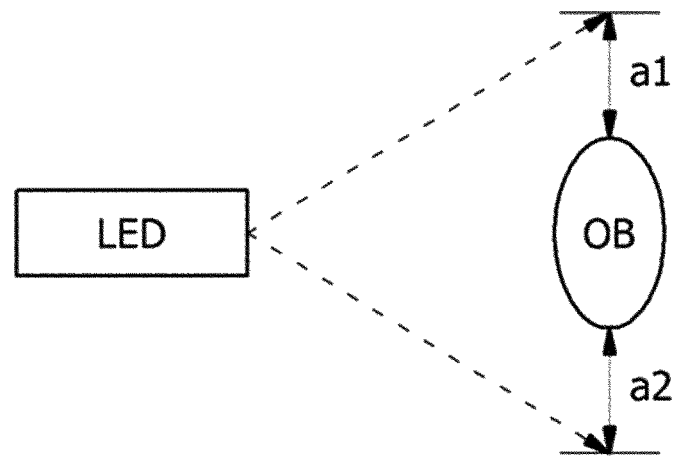
FIG. 8 is a view for describing an example in which an emission angle of the depth information extracting device according to another embodiment of the present disclosure is controlled by a holographic element.
Figure 8:
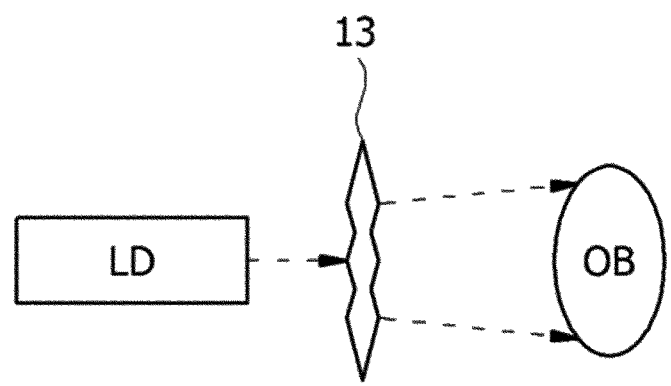
Figure 9:
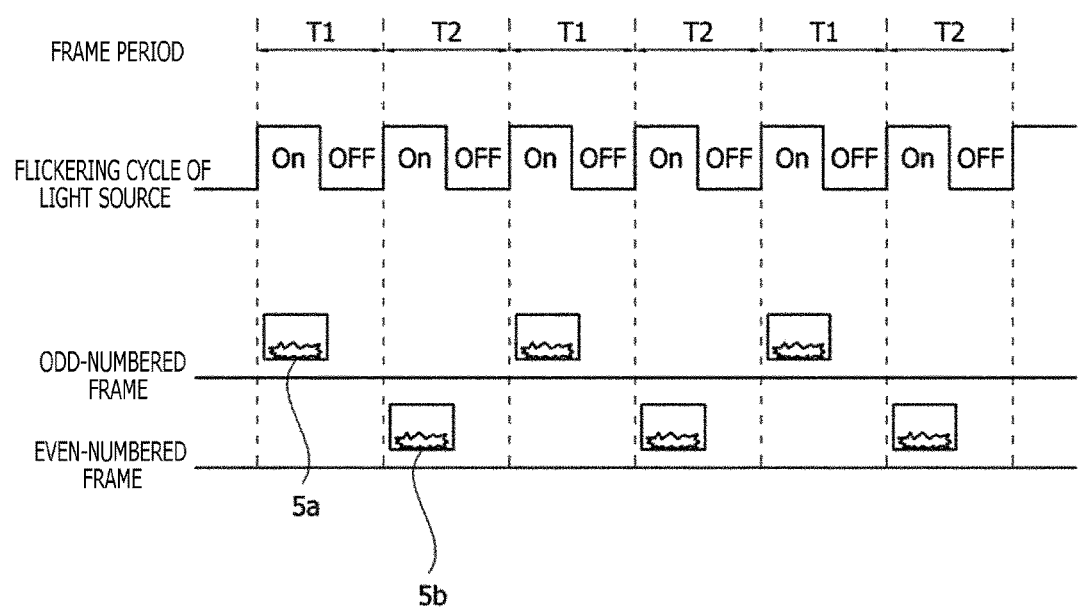
FIG. 9 is a view for describing a method in which the depth information extracting device according to another embodiment of the present disclosure generates frames by synchronizing with frame periods.
Figure 10:
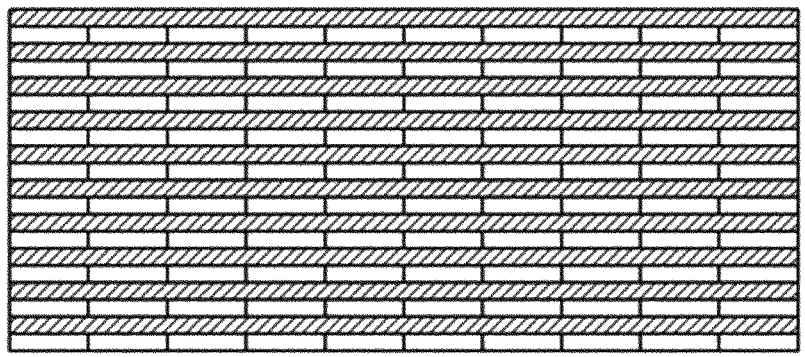
FIG. 10 is a view illustrating the depth information extracting device according to another embodiment of the present disclosure generating a depth image by merging odd-numbered frames and even-numbered frames.
Figure 10:
Figure 10:
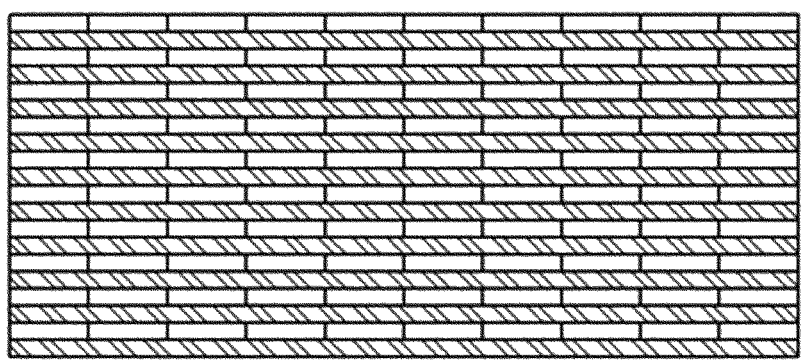
Figure 10:
Figure 10:
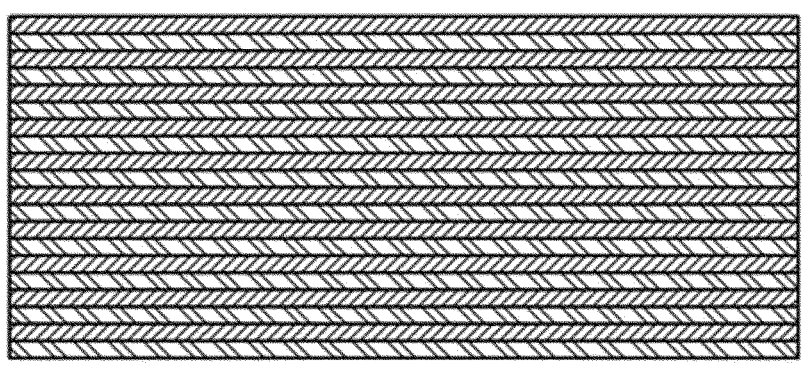

FIG. 7 is a block diagram schematically illustrating a depth information extracting device according to another embodiment of the present disclosure. FIG. 8 is a view for describing an example in which the emission angle of the depth information extracting device according to another embodiment of the present disclosure is controlled by a holographic element. FIG. 9 is a view for describing a method in which the depth information extracting device according to another embodiment of the present disclosure generates frames by synchronizing with frame periods. FIG. 10 is a view illustrating the depth information extracting device according to another embodiment of the present disclosure generating a depth image by merging odd-numbered frames and even-numbered frames. Descriptions of contents overlapping with those of FIGS. 1 to 6 will be omitted.

Referring to FIG. 7, a depth information extracting device according to another embodiment of the present disclosure may include a depth sensor module 10, a signal processing unit 31, and a deinterlacer 32. The elements illustrated in FIG. 7 are not essential, and thus a depth information extracting device according to an embodiment of the present disclosure may include more or less elements.

The depth sensor module 10 is a time of flight (TOF) sensor module and may include a light emitting unit and a light receiving unit.

The light emitting unit of the depth sensor module 10 may include a light source 11, a lens 12, a holographic element 13, an actuator 14, and a controlling unit 15. Here, the light source 11 may be used together with a light outputting unit, and the holographic element 13 and the actuator 14 may be used together with a light adjusting unit.

The light source 11 includes a light emitting element and serves to drive the light emitting element to irradiate an object OB with light having a predetermined phase. The light source 11 may synchronize with a preset frame period and operate to repeat flickering.

Although the light emitting element included in the light source 11 may include a laser, a laser diode, etc., other types of light sources may also be used. Light radiated from laser or a laser diode has relatively better directionality than light radiated from a light emitting diode (LED). Consequently, when a laser or a laser diode is used as the light source 11, the emission angle and radiation region may be easily adjusted.

The wavelength of light radiated from the light source 11 may be included in an IR band but may also be included in other wavelength bands.

The lens 12 is arranged on an optical path of the light radiated from the light source 11 and serves to convert light radiated from the light source 11, which is a point light source, into a surface light source. A laser has excellent directionality but has a relatively small emission angle. Consequently, the lens 12 may be used to uniformly irradiate the whole object OB with light to acquire a depth image.

The holographic element 13 is arranged between the light source 11 and the object OB or between the lens 12 and the object OB and serves to control the emission angle and irradiation region of the light radiated from the light source 11.

(A) of FIG. 8 illustrates a case in which the object OB is irradiated with light radiated from a light source (LED) without the holographic element 13, and (B) of FIG. 8 illustrates a case in which the object OB is irradiated with the light radiated from the light source (LED) after the emission angle thereof is adjusted by the holographic element 13.

Referring to (A) of FIG. 8, regions a1 and a2, other than a region of a sensor on which an image is projected are also irradiated with light from the LED, thus decreasing optical efficiency.

On the other hand, referring to (B) of FIG. 8, the emission angle of the light radiated from the LED is adjusted by the holographic element 13 so that the light does not deviate much from the region of the sensor on which an image is projected (viewing angle), thus minimizing wasted light and improving optical efficiency.

Meanwhile, since the lens 12 is not essential, the lens 12 may also be omitted when uniformity of illumination is provided by the holographic element 13.

Again, referring to FIG. 7, the holographic element 13 may be manufactured using a computer generated hologram (CGH) method. A hologram is an interference pattern generated from a signal wave containing information scattered from an object and a coherent reference wave, and the CGH method is a method of mathematically calculating and generating the interference pattern using a computer.

The holographic element 13 may be formed by recording an interference pattern calculated by a computer in a recording medium.

The recording medium in which an interference pattern is recorded in the holographic element 13 may include a substrate formed of a photosensitive material. A photopolymer, an ultraviolet (UV) photopolymer, a photoresist, a silver halide emulsion, dichromated gelatin, a photographic emulsion, photothermoplastic, photorefractive material, etc. may be used as the photosensitive material.

The holographic element 13 may be a volume holographic element or a surface holographic element.

A volume holographic element is a holographic optical element in which an interference pattern generated in a space due to interference between a signal wave and a reference wave is three-dimensionally recorded in a recording medium. On the other hand, a surface holographic element is a holographic optical element in which an interference pattern generated in a space due to interference between a signal wave and a reference wave is recorded on a surface of a recording medium.

When the holographic element 13 is a surface holographic element, an interference pattern may be formed on an exiting surface through which light incident from the light source 11 exits.

The holographic element 13 is connected to the actuator 14, and a position, tilting, etc. of the holographic element may be adjusted by the actuator 14.

The actuator 14 is a driving device that drives the holographic element 13 and may adjust the position, the tilting, etc. of the holographic element 13 with respect to an optic axis of the light source 11.

When the position, the tilting, etc. of the holographic element 13 is changed, an irradiation region, in which the object OB is irradiated with light that has passed through the holographic element 13, shifts, causing a region in which light reflected by the object OB is projected onto each cell of a sensor unit 22 to also shift.

The actuator 14 may drive the holographic element 13 based on a control signal of the controlling unit 15 so that the irradiation region of the holographic element 13 is switched. That is, the actuator 14 may drive the holographic element 13 so that an irradiation region of the holographic element 13 in an odd-numbered frame period is different from an irradiation region of the holographic element 13 in an even-numbered frame period.

The irradiation region of the holographic element 13 in an odd-numbered frame period may be a region that has moved upward or downward by as much as a region matching one cell of the sensor unit 22 from the radiation region of the holographic element 13 in an even-numbered frame period. That is, the radiation region of the holographic element 13 may be adjusted in every frame period so that a position at which an image is projected onto a cell of the sensor unit 22 in an odd-numbered frame period is different from a position at which an image is projected onto a cell of the sensor unit 22 in an even-numbered frame period by one cell. Accordingly, even when light is reflected from the same point, a position thereof at which an image is projected onto a cell of the sensor unit 22 in an odd-numbered frame period and a position thereof at which an image is projected onto a cell of the sensor unit 22 in an even-numbered frame period may be different by one cell.

The actuator 14 may be a voice coil moto (VCM) actuator or a microelectromechanical (MEMS) actuator.

The controlling unit 15 may control the light source 11 to be turned on or off based on a preset frame period.

For example, as in FIG. 9, the controlling unit 15 may periodically turn the light source 11 on or off so that the light source 11 flickers at every frame period. That is, the controlling unit 15 may perform operations of turning on the light source 11 to irradiate with light when frame periods T1 and T2 begin and turning off the light source 11 after a predetermined amount of time passes to control irradiation with light to be stopped until the end of the frame periods T1 and T2 every frame periods T1 and T2.

The controlling unit 15 may control the actuator 14 so that the radiation region of the holographic element 13 is switched at every frame period.

The light receiving unit of the depth sensor module 10 may include a light receiving lens 21 and the sensor unit 22. In this specification, the light receiving unit may be used together with the light inputting unit.

The light receiving lens 21 is arranged between the object OB and the sensor unit 22 and serves to receive reflected light reflected from the object OB and make the received reflected light be incident on the sensor unit 22.

The sensor unit 22 receives the reflected light reflected from the object OB, converts the received reflected light into an electrical signal, and outputs an image signal.

The sensor unit 22 may be formed of a plurality of cells, and each cell may correspond to each pixel forming a frame. The sensor unit 22 may receive light in units of cells and output an image signal in units of cells.

Each of the cells forming the sensor unit 22 may include an element that converts light into an electrical signal. Although not limited thereto, each of the cells may include a metal-oxide semiconductor (MOS), a charge coupled device (CCD), etc.

The sensor unit 22 may synchronize with a preset frame period to receive reflected light and convert the received reflected light into an image signal to be output.

Meanwhile, as the radiation region is switched at every frame period by the holographic element 13, a position at which an image is projected on the sensor unit 22 may also be switched every frame period.

The holographic element 13 irradiates, with light, different regions in an odd-numbered frame period and an even-numbered frame period by the actuator 14. Accordingly, even when light is reflected from the same position of the object OB, a position thereof at which an image is projected on the sensor unit 22 in an odd-numbered frame period and a position thereof at which an image is projected on the sensor unit 22 in an even-numbered frame period may be different.

An image projected on the sensor unit 22 in an odd-numbered frame period may be projected by moving upward or downward by as much as one cell from an image projected on the sensor unit 22 in an even-numbered frame period.

The signal processing unit 31 performs signal processing such as sampling with respect to an image signal output from the sensor unit 22 to generate a frame. Here, the frame may include a plurality of pixels, and a pixel value of each of the pixels may be acquired from an image signal corresponding to each of the pixels.

The signal processing unit 31 may output an image signal output from the sensor unit 22 corresponding to a frame period by converting the image signal into a frame.

For example, as in FIG. 9, the signal processing unit 31 may output image signals by converting the image signals into frames 5a and 5b at every frame periods T1 and T2 and synchronize with each of an odd-numbered frame period T1 and an even-numbered frame period T2 to output an odd-numbered frame 5a and an even-numbered frame 5b.

The signal processing unit 31 may also calculate depth information corresponding to each cell, i.e., each pixel based on a phase difference between light received through each cell of the sensor unit 22 and light radiated by the light source 11. The calculated depth information is stored corresponding to each pixel forming a frame.

The deinterlacer 32 may receive each of an odd-numbered frame and an even-numbered frame from the signal processing unit 31 and merge the two frames to generate one depth image.

The deinterlacer 32 may generate a depth image with resolution that has increased twice compared to resolution of the sensor unit 22 by alternately inserting an odd-numbered frame and an even-numbered frame output from the signal processing unit 31 in units of lines. For example, as in FIG. 10, each of the odd-numbered frame and the even-numbered frame has a resolution of 10 (line)×10 (column) pixel, and a resolution of a depth image in which the two frames are alternately merged in the units of lines is 20 (line)×20 (column) pixel. Vertical resolution has increased twice compared to the resolution of the sensor unit 22. The controlling unit 15, the signal processing unit 31, and the deinterlacer 32 of FIG. 7 may correspond to the controlling unit 14 of FIG. 1.

Figure 11:
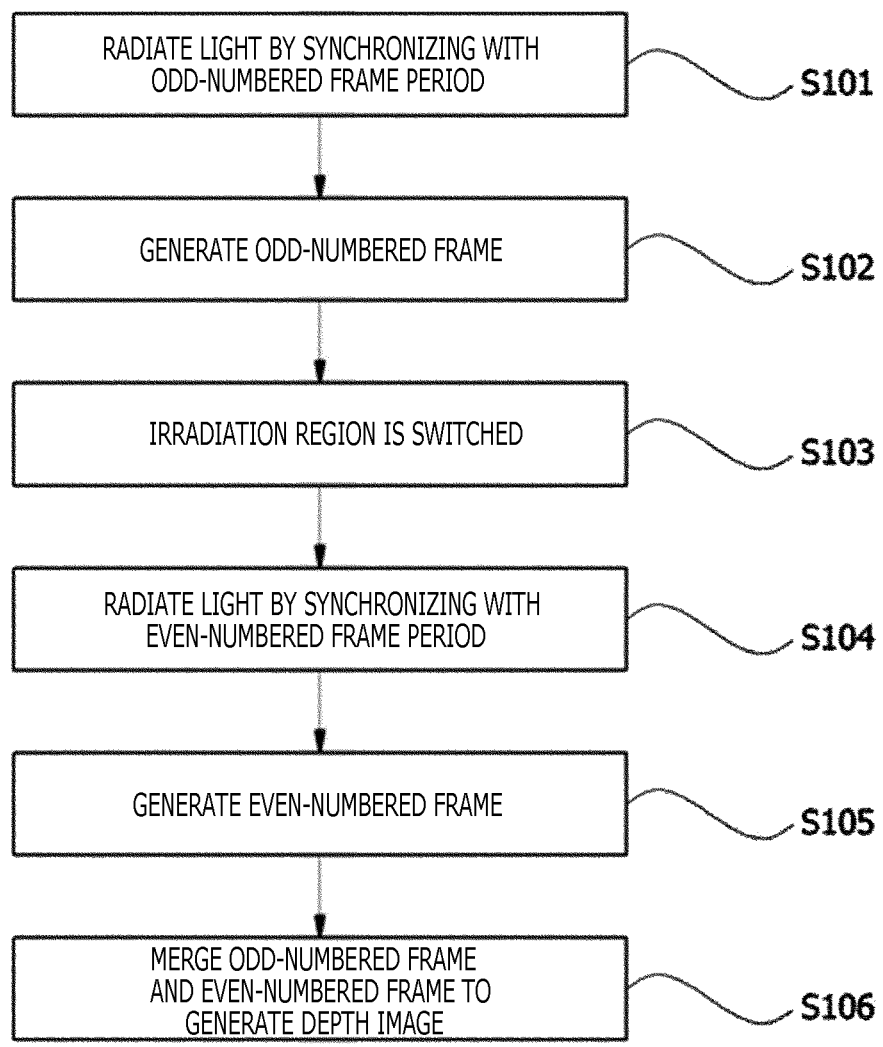
FIG. 11 is a flowchart illustrating a depth information extracting method of the depth information extracting device according to another embodiment of the present disclosure.

FIG. 11 is a flowchart illustrating a depth information extracting method of the depth information extracting device according to another embodiment of the present disclosure.

Referring to FIG. 11, the depth sensor module 10 controls the light source 11 to radiate light by synchronizing with an odd-numbered frame period (S101).

In Step S101, an irradiation region of the light radiated from the light source 11 may be controlled by the holographic element 13.

As the light radiated from the light source 11 is reflected from an object and incident on the sensor unit 22, the sensor unit 22 generates an image signal corresponding to the light in units of pixels. In addition, the signal processing unit 31 performs signal processing of the image signal output from the sensor unit 22 to generate an odd-numbered frame (S102).

When the odd-numbered frame is acquired, the depth sensor module 10 controls the holographic element 13 and shifts an irradiation region in which an object is irradiated with light (S103).

In Step S103, the depth sensor module 10 may shift the irradiation region by controlling the actuator 14 to adjust a slope of the holographic member 13.

When an even-numbered frame period begins, the depth sensor module 10 synchronizes with the even-numbered frame period and controls the light source 11 to radiate light (S104).

In Step S104, an irradiation region of the light radiated from the light source 11 may be different from that of the even-numbered frame period due to the holographic element 13.

As the light radiated from the light source 11 is reflected from an object and incident on the sensor unit 22, the sensor unit 22 generates an image signal corresponding to the light in units of pixels. In addition, the signal processing unit 31 performs signal processing of the image signal output from the sensor unit 22 to generate an even-numbered frame (105).

The deinterlacer 32 generates a depth image by merging an odd-numbered frame and an even-numbered frame in units of lines of pixel arrays that form the frames (S106).

In Step S106, the deinterlacer 32 may generate a depth image by sequentially and alternately merging lines of pixels of the odd-numbered frame and the even-numbered frame.

Hereinafter, referring to FIGS. 12 to 14, a depth information extracting method and a depth information extracting device for performing the method according to yet another embodiment of the present disclosure will be described in detail.

Figure 12:
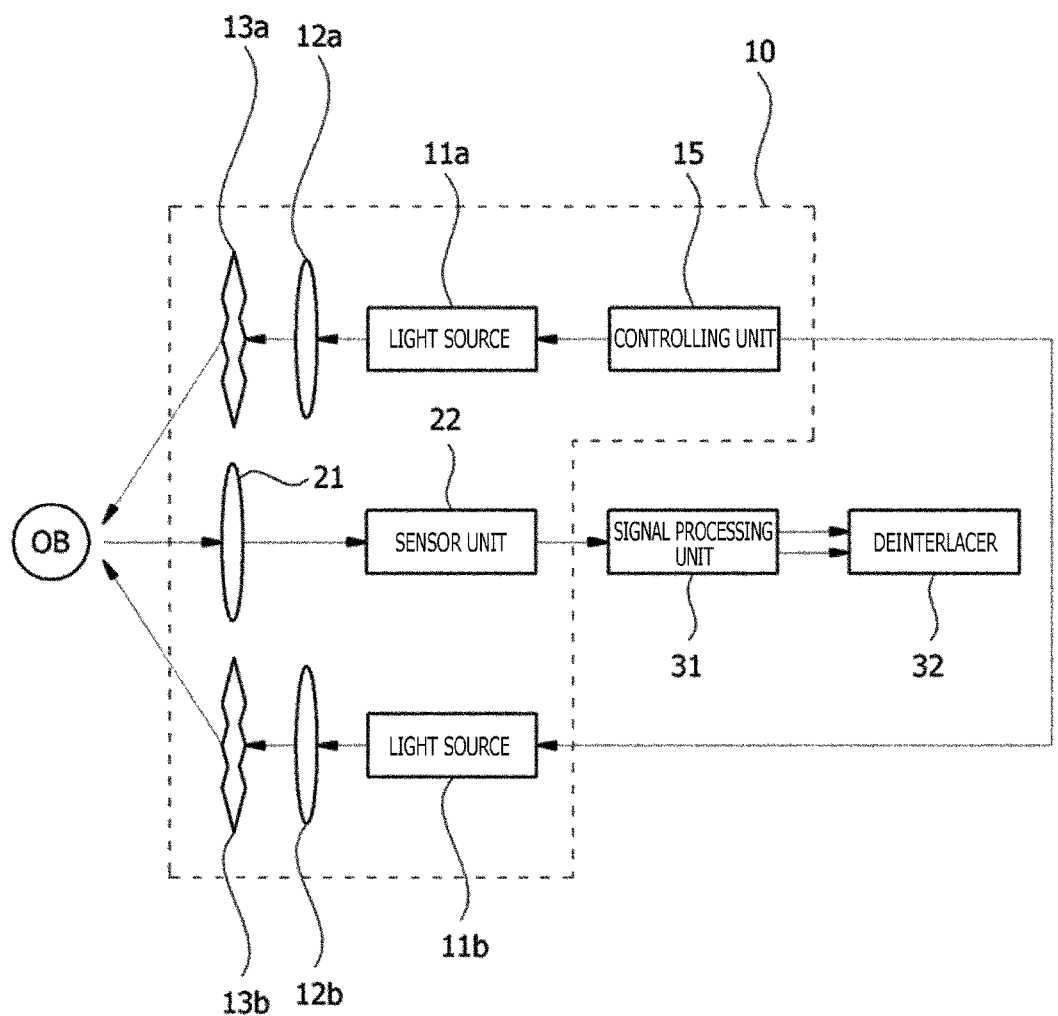
FIG. 12 is a block diagram schematically illustrating a depth information extracting device according to yet another embodiment of the present disclosure.

FIG. 12 is a block diagram schematically illustrating a depth information extracting device according to yet another embodiment of the present disclosure. FIG. 13 is a view for describing a method in which the depth information extracting device according to yet another embodiment of the present disclosure extracts depth information.

Hereinafter, to avoid overlapping descriptions, detailed descriptions of elements having the same function as in the depth information extracting device that has been described with reference to FIG. 7 will be omitted.

Referring to FIG. 12, a depth information extracting device according to yet another embodiment of the present disclosure may include the depth sensor module 10, the signal processing unit 31, and the deinterlacer 32. The elements illustrated in FIG. 12 are not essential, and thus the depth information extracting device according to yet another embodiment of the present disclosure may include more or less elements.

The depth sensor module 10 is a TOF sensor module and may include a plurality of light emitting units and light receiving units.

The plurality of light emitting units forming the depth sensor module 10 may each include light sources 11a and 11b, lenses 12a and 12b, and holographic elements 13a and 13b. The plurality of light emitting units may further include the controlling unit 15. Here, the light sources 11a and 11b may be used together with a light outputting unit, and the holographic elements 13a and 13b may be used together with a light adjusting unit.

The plurality of light sources 11a and 11b may be arranged by being spaced a predetermined interval from each other. The sensor unit 22 of the depth sensor module 10 may be arranged between the plurality of light sources 11a and 11b.

Hereinafter, for convenience of description, each of the plurality of light emitting units will be referred to as a first light emitting unit and a second light emitting unit, and elements forming the first light emitting unit will be referred to as a first light source 11a, a first lens 12a, and a first holographic element 13a. In addition, elements forming the second light emitting unit will be referred to as a second light source 11b, a second lens 12b, and a second holographic element 13b. However, the elements are not limited by terms including ordinals such as first and second.

The first and second light sources 11a and 11b are arranged to be spaced a predetermined interval from each other and serve to drive a light emitting element to irradiate the object OB with light having a predetermined phase.

The light emitting element included in the first and second light sources 11a and 11b may include a laser, a laser diode, etc., but other types of light sources may also be used. A wavelength of light radiated from the first and second light sources 11a and 11b may be included in an IR band but may also be included in other different wavelength bands.

Flickering of the first and second light sources 11a and 11b may be controlled so that the first and second light sources 11a and 11b emit light in different frame periods. For example, the first light source 11a may emit light by synchronizing with an odd-numbered frame period, and the second light source 11b may emit light by synchronizing with an even-numbered frame period.

The first lens 12a is arranged on an optical path of light radiated from the first light source 11a and serves to convert the light radiated from the first light source 11a which is a point light source into a surface light source. In addition, the second lens 12b is arranged on an optical path of light radiated from the second light source 11b and serves to convert the light radiated from the second light source 11b which is a point light source into a surface light source.

The first holographic element 13a is arranged between the first light source 11a and the object OB or between the first lens 12a and the object OB and serves to control the emission angle and irradiation region of the light radiated from the first light source 11a. In addition, the second holographic element 13b is arranged between the second light source 11b and the object OB or between the second lens 12b and the object OB and serves to control the emission angle and irradiation region of the light radiated from the second light source 11b.

Meanwhile, the first and second lenses 12a and 12b are not essential and thus may be omitted when uniformity of illumination is provided by the first and second holographic elements 13a and 13b.

The first and second holographic elements 13a and 13b may be manufactured using the CGH method.

The first and second holographic elements 13a and 13b are formed by recording an interference pattern calculated by a computer in a recording medium, and photosensitive material such as a photopolymer, a UV photopolymer, a photoresist, a silver halide emulsion, dichromated gelatin, a photographic emulsion, photothermoplastic, and photorefractive material may be used for the recording medium in which the interference pattern is recorded.

The first and second holographic elements 13a and 13b may be a volume holographic element or a surface holographic element.

Interference patterns recorded in the first and second holographic elements 13a and 13b may be formed so that different regions of the object OB are irradiated with light radiated by the first light source 11a and the second light source 11b.

For example, the interference patterns of the first holographic element 13a and the second holographic element 13b may be formed so that a region that is irradiated with light that exited from the first light source 11a and a region that is irradiated with light that exited from the second light source 11b is radiated are different from each other by as much as a region matching one cell of the sensor unit 22.

The controlling unit 15 may control the first and second light sources 11a and 11b to be turned on or off based on a preset frame period. For example, as in FIG. 13, the controlling unit 15 may control the first and second light sources 11a and 11b to be turned on or off so that the first light source 11a emits light by synchronizing with the odd-numbered frame period T1 and the second light source 11b emits light by synchronizing with the even-numbered frame period T2.

Accordingly, a light source with which object OB is irradiated may be switched at every frame period, and a region that is irradiated with light may also be switched corresponding to the switching of the light source by the first and second holographic elements 13a and 13b.

The light receiving unit of the depth sensor module 10 may include the light receiving lens 21 and the sensor unit 22.

The light receiving lens 21 is arranged between the object OB and the sensor unit 22 and serves to receive reflected light reflected from the object OB and make the received reflected light be incident on the sensor unit 22.

The sensor unit 22 may be formed of a plurality of cells, and each cell may correspond to each pixel forming a frame. The sensor unit 22 may receive light in units of cells and output an image signal in units of cells.

Although not limited thereto, each of the cells forming the sensor unit 22 may include an MOS, a CCD, etc.

The sensor unit 22 may synchronize with a preset frame period to receive reflected light and convert the received reflected light into an image signal to be output.

As a light source that radiates light to the object OB is switched every frame period, a position at which an image is projected on the sensor unit 22 may also be switched at every frame period. That is, due to the switching of the light source, a region in an odd-numbered frame period irradiated with light and a region in an even-numbered frame period irradiated with light may be different from each other, and thus a slight difference may occur between positions of an image projected on the sensor unit 22 in the odd-numbered frame period and an image projected on the sensor unit 22 in the even-numbered frame period. For example, the image projected on the sensor unit 22 in the odd-numbered frame period may be projected by moving upward or downward by as much as one cell from the image projected on the sensor unit 22 in the even-numbered frame period.

The signal processing unit 31 may output an image signal output from the sensor unit 22 corresponding to a frame period by converting the image signal into a frame.

Figure 13:
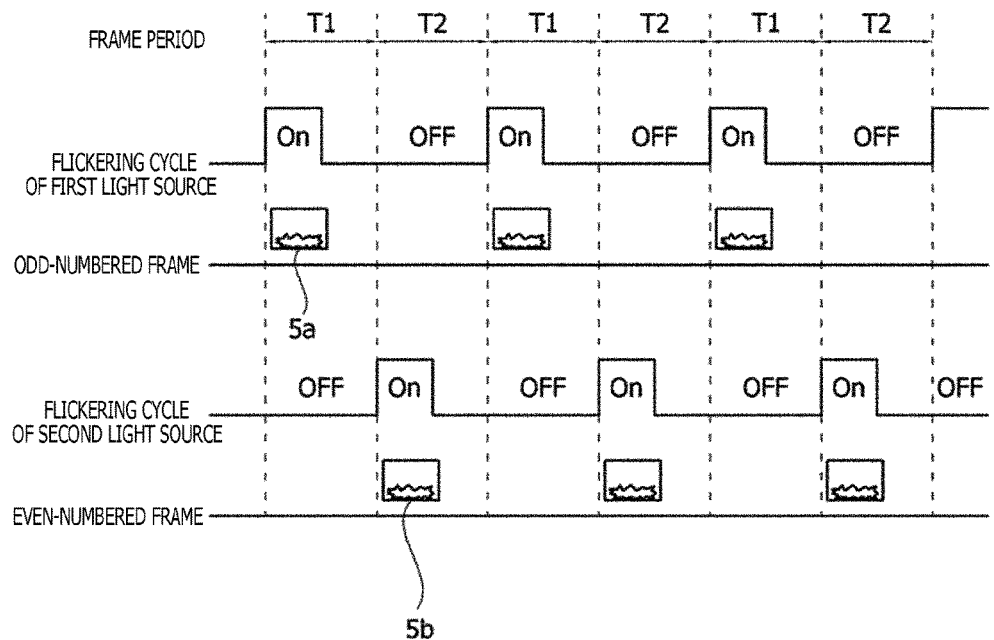
FIG. 13 is a view for describing a method in which the depth information extracting device according to yet another embodiment of the present disclosure extracts depth information.

For example, as in FIG. 13, the signal processing unit 31 may output image signals by converting the image signals into frames 5a and 5b every frame periods T1 and T2 and synchronize with each of the odd-numbered frame period T1 and the even-numbered frame period T2 to output the odd-numbered frame 5a and the even-numbered frame 5b.

The signal processing unit 31 may also calculate depth information corresponding to each cell, i.e., each pixel, based on a phase difference between light received through each cell of the sensor unit 22 and light radiated by the first and second light sources 11a and 11b. The calculated depth information is stored corresponding to each pixel forming a frame.

The deinterlacer 32 may receive each of an odd-numbered frame and an even-numbered frame from the signal processing unit 31 and merge the two frames to generate one depth image.

As illustrated in FIG. 10, the deinterlacer 32 may generate a depth image with a resolution that has increased twice compared to a resolution of the sensor unit 22 by alternately inserting an odd-numbered frame and an even-numbered frame output from the signal processing unit 31 in units of lines.

Figure 14:
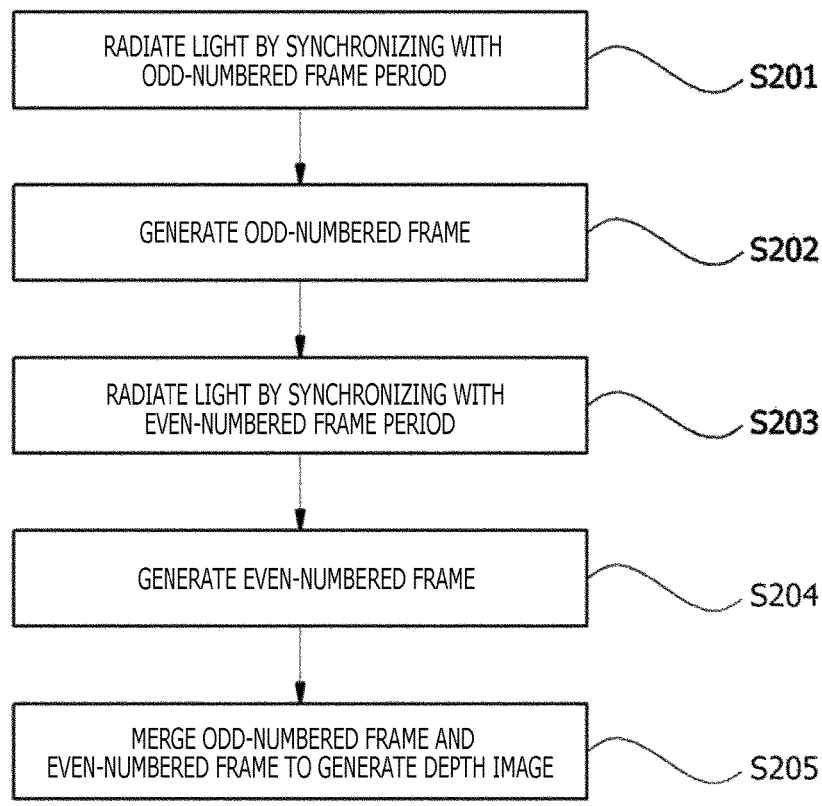
FIG. 14 is a flowchart illustrating a method of extracting depth information by the depth information extracting device according to yet another embodiment of the present disclosure.

FIG. 14 is a flowchart illustrating a method of extracting depth information by the depth information extracting device according to yet another embodiment of the present disclosure.

Referring to FIG. 14, the depth sensor module 10 controls the first light source 11a to radiate light by synchronizing with an odd-numbered frame period (S201).

In Step S201, an irradiation region of the light radiated from the first light source 11a may be controlled by the first holographic element 13a.

As the light radiated from the first light source 11a is reflected from an object and incident on the sensor unit 22, the sensor unit 22 generates an image signal corresponding to the light in units of pixels. In addition, the signal processing unit 31 performs a signal processing of the image signal output from the sensor unit 22 to generate an odd-numbered frame (S202).

Next, the depth sensor module 10 controls the second light source 11b to radiate light by synchronizing with an even-numbered frame period (S203).

In Step S203, the light radiated from the second light source 11b may be radiated by moving upward or downward from the radiation region in Step S201 by the second holographic element 13b.

As the light radiated from the second light source 11b is reflected from an object and incident on the sensor unit 22, the sensor unit 22 generates an image signal corresponding to the light in units of pixels. In addition, the signal processing unit 31 performs a signal processing of the image signal output from the sensor unit 22 to generate an even-numbered frame (S204).

As the light radiated from the light source 11 is reflected from an object and incident on the sensor unit 22, the sensor unit 22 generates an image signal corresponding to the light in units of pixels. In addition, the signal processing unit 31 performs a signal processing of the image signal output from the sensor unit 22 to generate an even-numbered frame (S204).

The deinterlacer 32 generates a depth image by merging an odd-numbered frame and an even-numbered frame in units of lines of pixel arrays that form the frames (S205).

In Step S106, the deinterlacer 32 may generate a depth image by sequentially and alternately merging lines of pixels of the odd-numbered frame and the even-numbered frame.

According to an embodiment of the present disclosure, one depth image is generated by adjusting irradiation regions of a light source to be different between an odd-numbered frame period and an even-numbered frame period using a holographic element and merging an odd-numbered frame and an even-numbered frame obtained by the above method, thereby having an effect of improving resolution of the depth image.

In addition, a holographic element is used to adjust the emission angle of light, thereby having an effect of improving optical efficiency.

Although the present disclosure has been described with reference to the exemplary embodiments of the present disclosure, those of ordinary skill in the art should understand that the present disclosure may be modified and changed in various ways within the scope not departing from the spirit and area of the present disclosure described in the claims below.

The invention claimed is:

1. A device for extracting depth information, the device comprising:
    a light outputting unit configured to output infrared (IR) light;
    a light inputting unit configured to be input with light output from the light outputting unit which has been reflected from an object;
    a light adjusting unit configured to adjust the angle of the output infrared light such that a first region including an object is irradiated with output infrared light and then adjust the angle of the output infrared light such a second region is irradiated with the output infrared light; and
    a controlling unit configured to estimate motion of the object using at least one of infrared light input into the first region and infrared light input into the second region.

2. The device of claim 1, wherein the first region is an entire region including the object, and the second region is extracted from the first region and is a partial region including a predetermined region of the object.

3. The device of claim 2, wherein the controlling unit calculates a time of flight taken for light output from the light outputting unit to be input into the light inputting unit after being reflected from the second region that is irradiated with the light.

4. The device of claim 3, wherein the controlling unit estimates motion in the second region using a first time of flight calculated using light input at a first time point, a second time of flight calculated using light input before the first time point, and a third time of flight calculated using light input after a second time point.

5. The device of claim 4, wherein the controlling unit estimates motion in the second region using relative differences between the first time of flight, the second time of flight, and the third time of flight and then compensates for the estimated motion using an interpolation technique.

6. The device of claim 3, wherein:
    the light inputting unit includes a plurality of pixels each including a first reception unit and a second reception unit; and
    the controlling unit calculates the time of flight using a difference in amounts of light input into the first reception unit and the second reception unit.

7. The device of claim 1, wherein the light adjusting unit includes a microelectromechanical system (MEMS) and a MEMS controlling unit.

8. The device of claim 1, wherein the controlling unit includes:
    a timing controlling unit configured to control time points of the light outputting unit, the light adjusting unit, and the light inputting unit;
    a conversion unit configured to convert an electrical signal input through the light inputting unit into a digital signal; and
    a signal processing unit configured to calculate times of flight of beams of light sequentially input into the second region over time, estimate a motion in the second region, and extract depth information of the second region.

9. The device of claim 1, wherein the light adjusting unit includes a holographic element arranged between the light outputting unit and the object and an actuator configured to drive the holographic element.

10. The device of claim 1, wherein:
    the first region and the second region are regions that do not overlap each other; and
    the light adjusting unit adjusts the angle of light so that a region that is irradiated with the light changes at every frame period.

11. A method for extracting depth information, the method comprising:
    irradiating a first region including an object with infrared (IR) light; then irradiating a second region including the object with IR light, the second region being a partial region of the first region;
    estimating motion of the object using beams of IR light sequentially input into the second region over time, and
    extracting depth information based on the estimated motion of the object.

12. The method of claim 11, wherein the estimating includes:
    calculating a first time of flight with respect to a first IR light input of the sequential beams of IR light at a first time point, a second time of flight with respect to a second IR light input of the sequential beams of IR light before the first time point, and a third time of flight with respect to a third IR light input of the sequential beams of IR light after a second time point; and
    estimating motion of the object in the second region using relative differences between the first time of flight, the second time of flight, and the third time of flight.

* * * * *